United States Patent [19]
Häfner et al.

[11] Patent Number: 4,546,426
[45] Date of Patent: Oct. 8, 1985

[54] METHOD FOR CONTROLLING THE POSITION OF AN ACTUATOR IN A MANNER WHEREBY THE ADJUSTMENT IS ADAPTIVE

[75] Inventors: Günther Häfner, Stuttgart; Karl-Ernst Noreikat, Esslingen; Hans-Dieter Schmidt, Wendlingen; Ulrich Letsche; Bernhard Bauer, both of Stuttgart, all of Fed. Rep. of Germany

[73] Assignee: Daimler-Benz Aktiengesellschaft, Stuttgart, Fed. Rep. of Germany

[21] Appl. No.: 470,973

[22] Filed: Mar. 1, 1983

[30] Foreign Application Priority Data

Mar. 2, 1982 [DE] Fed. Rep. of Germany ....... 3207392

[51] Int. Cl.[4] ................ G05B 13/04; G05D 7/06
[52] U.S. Cl. ............................. 364/153; 318/561; 364/149; 364/157
[58] Field of Search .............. 364/148, 149, 150, 151, 364/157, 431.03; 123/339, 352, 357, 501, 502; 318/561

[56] References Cited

U.S. PATENT DOCUMENTS

| | | | |
|---|---|---|---|
| 3,535,496 | 10/1970 | Bakke | 364/157 |
| 3,552,428 | 1/1971 | Pemberton | 364/157 |
| 3,622,809 | 12/1971 | Pieper | 91/363 R |
| 4,195,337 | 3/1980 | Bertrand et al. | 364/151 |
| 4,380,979 | 4/1983 | Takase | 123/339 |
| 4,407,013 | 9/1983 | Arcara et al. | 364/157 |
| 4,417,554 | 11/1983 | Dinger | 123/357 |
| 4,481,567 | 11/1984 | Kaya et al. | 364/157 |

FOREIGN PATENT DOCUMENTS

| | | |
|---|---|---|
| 1141007 | 12/1962 | Fed. Rep. of Germany . |
| 2233851 | 1/1973 | Fed. Rep. of Germany . |
| 2624574 | 12/1977 | Fed. Rep. of Germany . |
| 2638462 | 3/1978 | Fed. Rep. of Germany . |
| 136662 | 7/1979 | German Democratic Rep. . |
| 487457 | 3/1970 | Switzerland . |

OTHER PUBLICATIONS

Schleuning: Die Wirkung des progressiven dynamischen Verhaltens von Impulsreglern, Regelungstechnik, 1962, #2, pp. 71–77.

Buxbaum: Adaptive Antriebsregelungen, Regelungstechnische Praxis, vol. 18, #5, pp. 117–144, 1976.

Wierschem: Einfache Lageregelungen für einen hydraulischen Antrieb, Regelungstechnik vol. 28, #11, 1980, pp. 365–372.

Primary Examiner—Felix D. Gruber
Attorney, Agent, or Firm—Barnes & Thornburg

[57] ABSTRACT

A method and an apparatus for controlling the position of an actuator contemplates generating a signal indicative of actuator position, generating a signal indicative of desired actuator position, comparing the actuator position signal to the desired actuator position signal, and generating an error signal from the comparison. The error signal is provided to a control unit, and an adaptation signal is generated in an adaptive system. A control signal is provided by the control unit, and is combined with the adaptation signal to provide an adapted control signal. The adapted control signal is provided to the actuator to control it.

20 Claims, 5 Drawing Figures

1

METHOD FOR CONTROLLING THE POSITION OF AN ACTUATOR IN A MANNER WHEREBY THE ADJUSTMENT IS ADAPTIVE

BACKGROUND AND SUMMARY OF THE INVENTION

The invention relates to a method for controlling the position of an actuator, in a manner whereby the position is adjusted adaptively. The invention is disclosed in the context of a method for controlling the position of an actuator which incorporates a servo valve and a servo drive wherein arrangements are made to connect the servo drive to a control device which is to be actuated in a fixed manner. It is possible to activate the servo drive by means of the servo valve. The servo drive is provided with a sensor which determines a change in a measured quantity (the actual value), as a function of a displacement of a movable piston in the servo drive. This change is fed back to a control unit.

German Offenlegungsschrift No. 2,233,851 discloses a method in which a control-slider is shifted by means of an electrical control unit which determines the difference between the actual value and the required value. Although, in these measurements, which are based on the difference between the required and actual values, steady-state control-deviations are admittedly avoided, the accompanying control-behaviour, namely the speed with which the actuator reacts to changes in the required value, is inadequate.

According to the invention, a method of the above-mentioned type is provided for controlling the position of an actuator, in a manner whereby the position is adjusted adaptively, in which method the control-behaviour of the actuator is optimised, while minimising the control-deviations.

The method according to the invention permits the use of a servo valve which can be constructed with the aid of a modest precision-engineering effort, and which is amendable, despite the absence of any means of compensating-out the influences of varying operating conditions, to the adjustment of its actual characteristics-band in a manner whereby these characteristics are matched to a theoretical characteristic curve by means of an adaptation system which is economical to produce, and, as a result of this adjustment, optimum control is assured. The adaptation system according to the invention is more economical than the use of a precision-type servo valve.

According to the invention, a method of controlling the position of an actuator comprises the steps of generating a signal indicative of actuator position, generating a signal indicative of desired actuator position, comparing the actuator position signal to the desired actuator position signal, generating an error signal from the comparison, providing the error signal to a control unit, generating an adaptation signal in an adaptive system, generating a control signal in the control unit, combining the control signal with the adaptation signal to provide an adapted control signal, and providing the adapted control signal to the actuator to control it.

Illustratively, the step of providing the adapted control signal to the actuator comprises the step of supplying the adapted control signal to a triggering system, generating an actuator control signal in the triggering system and supplying the actuator control signal to the actuator to control it.

Further, in an illustrative embodiment, the step of generating an error signal comprises the step of subtracting one of the actuator position signal and desired actuator position signal from the other of such signals.

Additionally according to an illustrative embodiment, the step of generating an adaptation signal comprises the steps of providing the error signal to the adaptive system, generating a signum function in response to the error signal, providing the signum function to a summing point, integrating the signal from the summing point, operating on the integral with a hysteresis function, providing the result of the hysteresis operation to the summing point, and integrating the result of the hysteresis operation to provide the adaptation signal.

Alternatively, the step of generating an adaptation signal comprises the steps of providing the control signal to a model of the triggering system, generating in the triggering system model a model of the triggering system response to the control signal, comparing the model's response to the response of the triggering system, generating a second error signal based upon the comparison of the triggering system's response to the control signal and the model's response to the control signal, processing the second error signal in a parameter adjustment system to generate parameter adjustment signals, and providing the parameter adjustment signals to the model, and the step of combining the control signal with the adaptation signal to provide an adapted control signal comprises the step of providing the parameter adjustment signals to the control unit.

According to this alternative embodiment, the step of providing the parameter adjustment signals to the control unit comprises the steps of providing signals from the parameter adjustment system to a control unit modification system to generate the control unit parameter adjustment signals and providing the control unit parameter adjustment signals to the control unit.

According to another aspect of the invention, a method for adapting a control system comprises the steps of generating control system input errors, establishing a threshold error sign differential, above which threshold control system corrective action is indicated, determining whether errors of one sign predominate over errors of the other sign, comparing the predominance of errors of one sign over the other sign to the threshold, and generating an adaptation signal to the control system to take corrective action when the predominance exceeds the threshold.

According to an illustrative embodiment of the invention, the step of generating control system input errors comprises the steps of generating a desired value for the system being controlled, generating an actual value related to the current condition of the system being controlled, comparing the desired and actual values, and generating the control system input error.

Further according to this illustrative embodiment, the step of determining whether errors of one sign predominate over errors of the other sign comprises the step of assigning opposite signs to errors on opposite sides of the desired value.

Additionally according to this aspect of the invention, the step of determining whether errors of one sign predominate over errors of the other sign further comprises the step of integrating the signs of the errors.

According to this illustrative embodiment of the invention, the step of establishing a threshold error sign differential above which control system corrective action is indicated comprises the step of operating upon the integral of the error's signs with a hysteresis function.

Additionally, in this illustrative embodiment, the method includes the steps of maintaining the hysteresis function at its non-zero level until the integral of the signs of the errors goes to zero and subtracting one of the non-zero level of the hysteresis function and the assigned signs of the errors from the other of the non-zero level of the hysteresis function and the assigned signs of the errors to drive the integral of the signs of the errors to zero more rapidly.

Also in this illustrative embodiment, the step of generating a signal to the controllable system to take corrective action comprises the steps of integrating the non-zero level of the hysteresis function to generate the adaptation signal.

Additionally, in this illustrative embodiment, the method further comprises the step of generating an adapted control system output signal by subtracting one of the adaptation signal and the controllable system response to the input error from the other of the adaptation signal and the controllable system response to the input error.

Finally, this illustrative method further comprises the step of providing the adapted control system output signal to the apparatus controlled by the controllable system.

According to yet another aspect of the invention, an apparatus for controlling the position of an actuator comprises means for generating a signal indicative of actuator position, means for generating a signal indicative of desired actuator position, means for comparing the actuator position signal to the desired actuator position signal, means for generating an error signal from the comparison, means for providing the error signal to a control unit, means for generating an adaptation signal in an adaptive system, means for generating a control signal in the controller unit, means for combining the control signal with the adaptation signal to provide an adapted control signal, and means for providing the adapted control signal to the actuator to control it.

Additionally according to this aspect of the invention, the means for providing the adapted control signal to the actuator comprises means for supplying the adapted control signal to a triggering system, means of generating an actuator control signal in the triggering system and means for supplying the actuator control signal to the actuator to control it.

Further according to this aspect of the invention the means for generating an error signal comprises means for subtracting one of the actuator position signal and desired actuator position signal from the other of such signals.

Illustratively, according to this aspect of the invention the means for generating an adaptation signal comprises means for providing the error signal to the adaptive system, means for generating a signum function in response to the error signal, means for providing the signum function to an arithmetic point, means for integrating the signal at the arithmetic point, means for operating on the integral with a hysteresis function, means for providing the result of the hysteresis operation to the arithmetic point, and means for integrating the result of the hysteresis operation to provide the adaptation signal.

Alternatively, according to an illustrative embodiment, the means for generating an adaptation signal comprises means for providing the control signal to a model of the triggering system, means for generating in the triggering system model a model of the triggering system response to the control signal, means for comparing the model's response to the response of the triggering system, means for generating a second error signal based upon the comparison of the triggering system's response to the control signal and the model's response to the control signal, means for processing the second error signal in a parameter adjustment system to generate parameter adjustment signals, and means for providing the parameter adjustment signals to the model, and the means for combining the control signal with the adaptation signal to provide an adapted control signal comprises means for providing the parameter adjustment signals to the control unit.

According to this alternative, the means for providing the parameter adjustment signals to the control unit comprises means for providing signals from the parameter adjustment system to a control unit modification system to generate the control unit parameter adjustment signals and means for providing the control unit parameter adjustment signals to the control unit.

According to yet another aspect of the invention, an apparatus for adapting a control system comprises means for generating control system input errors, means for establishing a threshold error sign differential, above which threshold control system corrective action is indicated, means for determining whether errors of one sign predominate over errors of the other sign, means for comparing the predominance of errors of one sign over the other sign to the threshold, and means for generating an adaptation signal to the control system to take corrective action when the predominance exceeds the threshold.

Additionally according to this aspect of the invention the means for generating control system input errors comprises means for generating a desired value for the system being controlled, means for generating an actual value related to the current condition of the system being controlled, means for comparing the desired and actual values, and means for generating the control system input error.

Further according to this aspect, the means for determining whether errors of one sign predominate over errors of the other sign comprises means for assigning opposite signs to errors on opposite sides of the desired value.

Advantageously, according to an illustrative embodiment, the means for determining whether errors of one sign predominate over errors of the other sign further comprises means for integrating the signs of the errors.

Additionally according to this embodiment, the means for establishing a threshold error sign differential above which control system corrective action is indicated comprises means for operating upon the integral of the error's signs with a hysteresis function.

In accordance with an illustrative embodiment of this aspect, the apparatus further comprises means for maintaining the hysteresis function at its non-zero level until the integral of the signs of the errors goes to zero.

Additionally according to this illustrative embodiment, the apparatus further comprises means for subtracting one of the non-zero level of the hysteresis function and the assigned signs of the errors from the other of the non-zero level of the hysteresis function and the assigned signs of the errors to drive the integral of the signs of the errors to zero more rapidly.

Further according to this illustrative embodiment, the means for generating a signal to the control system to take corrective action comprises means for integrating the non-zero level of the hysteresis function to generate the adaptation signal.

Illustratively the apparatus further comprises means for generating an adapted control system output signal by subtracting one of the adaptation signal and the control system response to the input error from the other of the adaptation signal and the control system response to the input error.

Further, illustratively, the apparatus comprises means for providing the adapted control system output signal to the apparatus controlled by the control system.

Further objects, features and advantages of the present invention will become more obvious from the following description when taken in connection with the accompanying drawings which show, for purposes of illustration only, several embodiments in accordance with the present invention.

DETAILED DESCRIPTION OF THE DRAWINGS

Figure 1:
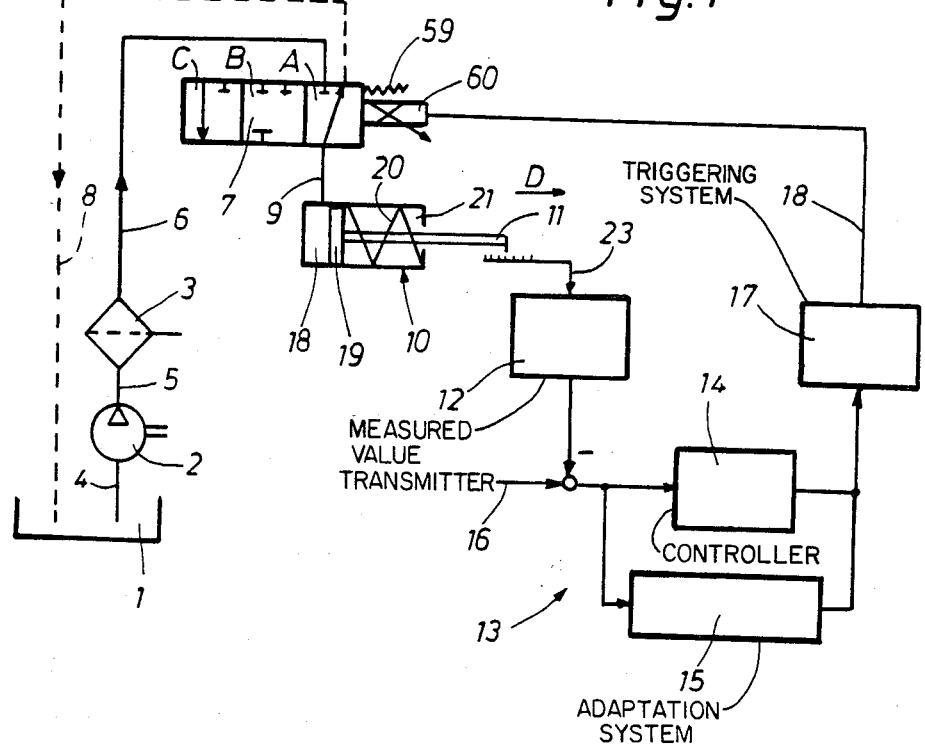
FIG. 1 shows an elementary diagram of a control circuit.

FIG. 1 represents an elementary diagram of a position control loop, this loop comprising a hydraulic fluid reservoir 1, a pressure-medium pump 2, and a filter 3, which are interconnected by means of tubular lines 4, 5, and being connected, via a pressure-medium line 6, to a three-way servo valve 7. Hydraulic fluid can be led back, from the three-way servo valve 7, to the hydraulic fluid reservoir 1 via a return-flow line 8. A servo drive 10, in particular a single-acting working cylinder, is connected, via a pressure-medium line 9, to the three-way servo valve 7, this working cylinder comprising a pressure-medium space 18, a piston 19, which is designed to have a piston rod 11, and a spring-space 21, which is provided with a return spring 20. Changes in the displacement of the piston rod 11 are relayed to a control loop 13, by means of a position sensor 23 which is equipped with a measured-value transmitter 12. The control loop 13 comprises a controller unit 14, an adaptation system 15, a required-value input-point 16, and a triggering unit 17 for triggering the three-way servo valve 7. The triggering unit 17 is connected to the drive-mechanism of the three-way servo valve via a control line 18.

Figure 4:
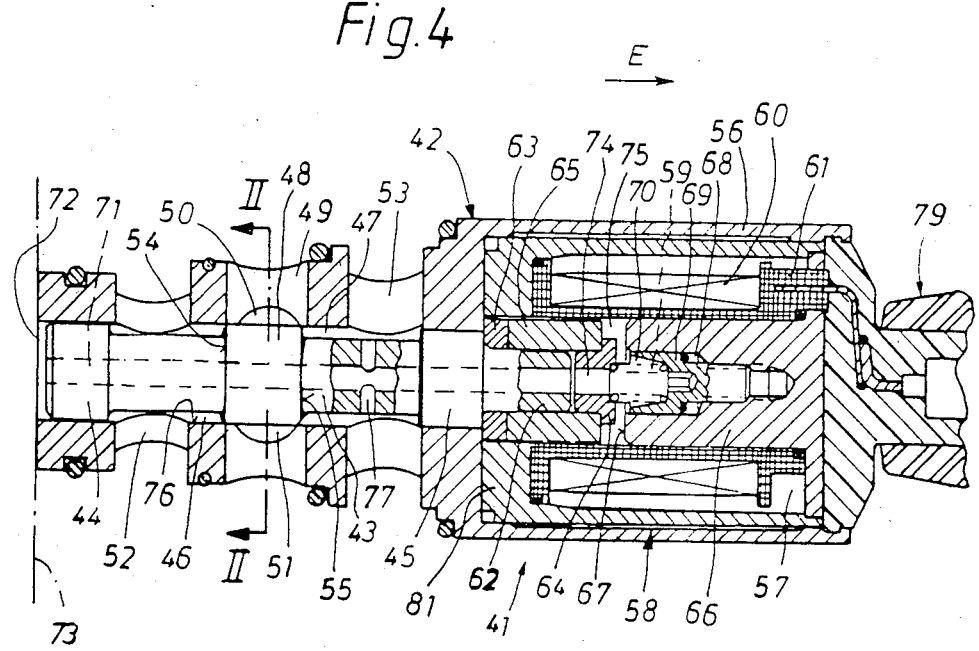
FIG. 4 shows a longitudinal section through the electrohydraulic three-way servo valve.
Figure 5:
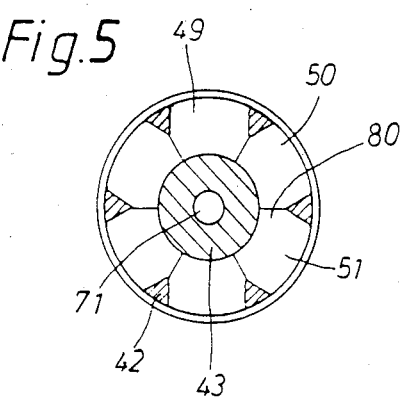
FIG. 5 shows a section along the line II—II in FIG. 4.

When no current is flowing through the electromagnetic coil 60 of the three-way servo valve 7, which is in the position A, a compression spring 59 holds a slider, which is explained in more detail in FIG. 4, in the position represented, in which the inflow of pressure-medium is shut off and the pressure-medium can drain from the pressure-medium space 18 of the working cylinder 10 and flow into the hydraulic fluid reservoir 1 via the return-flow line 8, this line having been opened.

If the electromagnetic coil 60 of the three-way servo valve 7 is supplied with 50 percent of the current which brings about the maximum deflection of the shifting unit, the slider is accordingly pushed, against the spring force of the compression spring 59, into the zone B, so that the inflow of pressure-medium from the pressure-medium pump 2 is shut off, as are the return-flow line 8 and the pressure-medium line 9 which leads to the working cylinder 10.

If the electromagnetic coil 60 of the three-way servo valve 7 is supplied with the current which causes the maximum deflection of the shifting unit, the slider is accordingly moved into the position C, pressure-medium is admitted to the pressure-medium space 18 of the working cylinder 10, and the return-flow line 8 to the hydraulic reservoir 1 is shut off. When this occurs, the piston 19 is pushed in the arrow-direction D, against the resetting force of the spring 20 in the spring-space 21. Using the piston rod 11, the measured-value transmitter 12 performs a position-measurement 23 which is relayed as the actual value, to the control loop. At the required-value input-point 16, this actual value is compared with a required value which, for example, is preset by an accelerator-pedal of a motor vehicle, and the control-deviation resulting from this comparison, is supplied to the control unit 14 and to the adaptation system 15.

The correcting value from the controller unit 14, which is corrected by the output of the adaptation system, is supplied to the triggering unit 17, this unit activating the drive of the servo valve 7 by means of pulse-width-modulated signals, in order, for example, to readjust the slider in position C, in a suitable manner. This procedure is repeated until the required value and the actual value are of equal magnitude.

Figure 2:
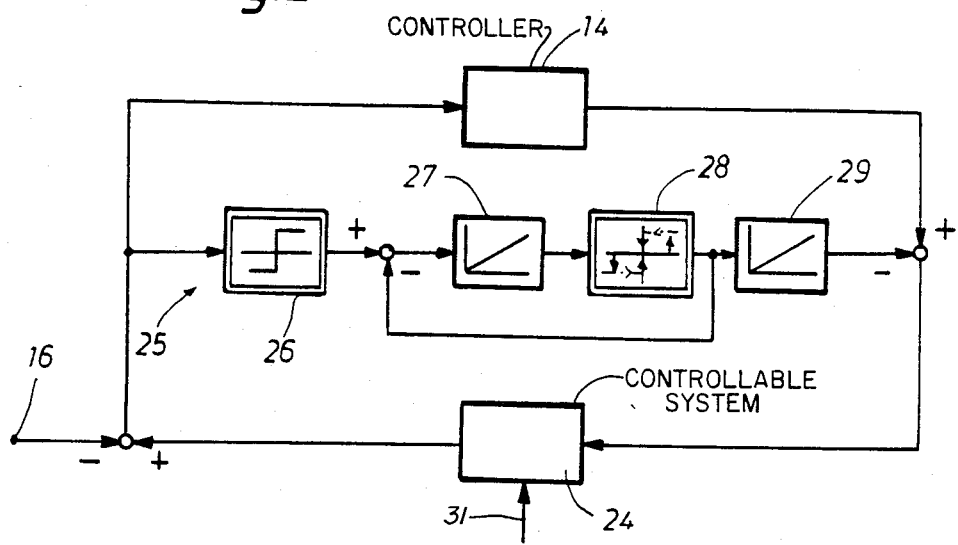
FIG. 2 shows a signal-flow diagram of an adaptive control loop for the partial compensation of disturbances.

FIG. 2 represents a signal-flow diagram of a control loop for the partial compensation of disturbances, this circuit operating in accordance with an adaptive method. The control loop comprises a required-value input-point 16, a controllable system 24, a controller unit 14, and an adaptation system 25, the latter possessing a non-linear element 26, an integrator 27, an element 28 possessing a hysteresis characteristic, and an integrator 29.

The adaptation system 25 is a special matching circuit which adjusts the correcting value in accordance with the nature of the disturbance which is occurring. The basic concept of the method is that, in an undisturbed master control loop in which the required value is varying randomly, positive and negative control-deviations occur at approximately equal frequencies. If, however, a disturbance occurs, this equilibrium can be disturbed, that is to say, depending on its nature, negative control-deviations occur more frequently than positive deviations, or vice versa. If now, when negative control-deviations are occurring frequently, the correcting value is increased by a value which increases until the negative control-deviations no longer occur at a higher frequency, the disturbances are completely balanced-out. In a corresponding manner, a numerically increasing negative correcting value can be added if positive control-deviations are occurring at the higher frequency.

When a new required value occurs, it is compared with an adjusted corrected value, and a control-deviation formed therefrom is supplied to the controller 14, this unit determining a new correcting value which, with the adjusting value of the adaptation system is applied to the controllable system 24. The control-deviation is likewise received by the non-linear element 26 in the adaptation system 25, this element 26 forming the signum function of the control-deviation. The output signal from the non-linear element 26 is supplied to the integrator 27. The integrator 27 supplies its output signal to the element 28 possessing a hysteresis characteristic, this element 28 accepting a positive value if the output from the integrator 27 exceeds a defined positive value, and accepting a negative value if the said output becomes lower than a defined negative value.

This value is fed back, in a negative feedback arrangement, as feedback to the input terminal of the integrator 27. The feedback process, in the negative feedback arrangement, is carried out in the manner whereby the feedback signal is numerically larger than the output signal from the non-linear element 26.

The output signal from the element 28 possessing a hysteresis characteristic retains its positive or, as the case may be, negative value until the input to this element 28 becomes zero. The output from the element 28 possessing a hysteresis characteristic acts on the integrator 29, the output from which is added to the correcting value in order to adjust the latter.

If the control unit is constructed in a digital design, for example by employing discrete TTL components, it is likewise possible to digitize the method. If a process computer (e.g. a microprocessor) is used for control purposes, the method is thus implemented by means of a relatively small number of program statements.

Figure 3:
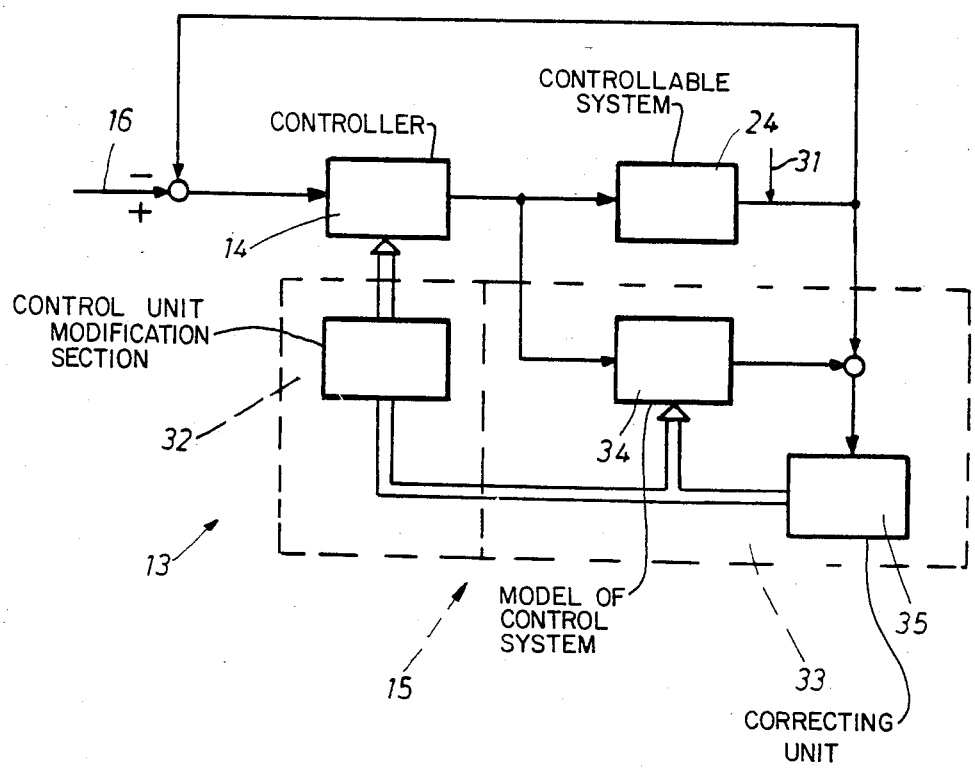
FIG. 3 shows a signal-flow diagram of an adaptive control loop which compensates more disturbances than the control loop shown in FIG. 2.

FIG. 3 shows the signal-flow diagram of an adaptive control loop 13, comprising the required-value input point 16, the controller unit 14, a controllable system 24, a disturbance variable 31, and the adaptation system 15.

The adaptation system 15 can be subdivided into a control-unit modification section 32 and an identification section 33. The identification section 33 incorporates a model of the control system 34 and a correcting unit 35.

A control-deviation is determined from the required and actual values, the required value being available for input into the control loop 13 and the actual value being obtained from the feed back from the negative feed back arrangement, this control-deviation being supplied to the control unit 14. The output signal from the controller unit 14 is an actuating variable, exciting the controllable system 24 and the model 34 of this system 24, arranged parallel thereto. The result of the comparison of the output from the controllable system and the model is an error which is caused, above all, by disturbances and the inaccuracy of the model. The error is supplied to the correcting unit 35, the model parameters, for example p ($=K_S$, $T_{IS}$, $T_1$, $T_2$ when $IT_2$ behaviour applies) being defined in a manner such that the time-averaged mean of the squares of the errors assumes a minimum value. In this optimisation strategy, it is possible, for example, to employ the gradient method.

The new parameters are supplied to the model 34 of the control system, and also to the modification unit 32 in which the recomputation of the control parameters for the control unit 14, and their adaptive adjustment, is carried out from the model parameters which have been identified.

It is possible, for example, to use the so-called value-criterion in order to set the characteristic parameters of a PID control unit to their optimum values, examples of these parameters being $K_P$, $T_I$ and $T_D$.

The adaptation system, 15,25, operates in real time, that is to say the model and the controller are continuously matched to the changing behaviour of the control system. Implementation is possible with the aid of analog-type components, but is also possible with the aid of a process computer.

The servo valve, marked 41 in FIG. 4, comprises a housing 42 and a slider 43 which is guided in this housing, in a manner permitting movement in the axial direction, and which is mounted in the housing 42 by means of guide-shoulders 44 and 45. Between the guide-shoulders 44 and 45, the slider 43 possesses annular spaces 46 and 47, together with a control-shoulder 48, the annular spaces being formed by machined-out clearances. In the region of the control-shoulder 48, control-bores 49, 50 and 51, formed by radial through-bores, connect the servo valve 41, via an annular space 80 and a control line, to, for example, a working cylinder, an inlet bore 52, formed by a radial through-bore, in the region of the machined-out clearance 46, connects the servo valve 41, via an annular space which is not marked more specifically, and an inlet line, to a hydraulic fluid reservoir, and a return-flow bore 53, formed by a radial through-bore, in the region of the machined-out clearance 47, connects the servo valve 41, via an annular space which is not marked more specifically, and return-flow lines, to the hydraulic fluid reservoir and, for example, to the working cylinder. Any desired number of control-bores can be chosen, corresponding to the through-flow requirements, these bores interacting with peripheral control edges 54 and 55 of the control-shoulder 48. The annular space 80 is formed by the control-bores 49, 50 and 51, which intersect in the region of the inner peripheral surface 76 of the housing 42. An electromagnetic shifting device 58 is installed in an end region 56 of the housing 42, in a recess 57, this device 58 enabling the slider 43 to be moved, in the radial direction, against the spring force of a compression spring 59. The shifting device 58 comprises an electromagnetic coil 60, which is surrounded by a pole-ring 85 and is potted inside a coil former 61, which is composed of substances which repel both water and oil, and an armature 65 which is locked, in a manner permitting axial adjustment, on a step 62 located at one end of the slider 43, between a spacer-ring 63, bearing against the guide-shoulder 45, and a centering-bush 64 which, in common with the spacer-ring 63, is manufactured from non-magnetic material. The coil former 61 is mounted on a magnet core 66 which is made of soft iron and possesses a self-tapping socket-head screw 69 in an axially drilled blind hole 68 on the end-face 67 facing the spacer-ring 63. In the region of the hexagonal socket, the screw 69 is provided with a recess 70, which is preferably conical in shape, the compression spring 59, which bears against the centering-bush 64, being supported in this recess. The slider 43 is provided with a leakage-line 71 which passes through it in the axial direction and connects a leakage-space 72, bounded, inter alia, by the housing mounting 73 indicated by a broken line to a leakage-space 75, via a leakage-line 74 passing axially through the centering-bush 64, and which is connected to the return-flow bore 53 via leakage-bores 77 which are formed by radial through-bores in the slider 43. Current is supplied to the electromagnetic coil 60 via an electrical connector 79 which is known per se.

When no electric current flows through the electromagnetic coil 60, the compression spring 59 holds the slider 43 in the position represented, in which the control-edge 54 shuts off the annular space 46 with respect to the control-bores 49, 50 and 51, and the control-edge 55 opens the annular space 47 with respect to the control-bores 49, 50 and 51, so that the inflow to the working cylinder, via the inlet bore 52, is closed, and the return flow from the working cylinder to the hydraulic fluid reservoirs, via the return-flow line 53 and the control-bores 49, 50 and 51, is opened. If current is supplied to the electromagnetic coil 60, the slider 43 is displaced in the arrow-direction E against the spring force of the compression spring 59, as a result of which pulse-width-modulated signals influence the position of the control-edges 54, 55, and hence influence the cross-sectional areas available for through-flow. If the slider 43 is displaced, in the arrow-direction E, by a distance such that the control-edges, 54 and 55, shut off the control-bores 49, 50 and 51 with respect to the inflow bore 52 and the return-flow bore 53 respectively, the slider 43 has reached its balanced position.

If the slider 43 is moved further in the arrow-direction E, beyond this balanced position, it reaches positions in which the control-edge 54 opens the annular space 46 with respect to the control-bores 49, 50 and 51, and the control-edge 55 shuts off the annular space 47 with respect to the control-bores 49, 50 and 51, so that the inflow to the working cylinder is opened via the inflow bore 52, and the return flow from the working cylinder to the hydraulic fluid reservoirs, via the return-flow bore 53 and the control-bores 49, 50 and 51, is closed.

As a result of the movement of the slider 43, in the arrow-direction E and, as the case may be, counter to this direction, and due also to the excitation of the coil 60 by the pulse-width-modulated signals, the latter causing vibration of the slider which has a beneficial effect on its control-behaviour, the resulting displacement effect induces leakage-oil to flow from the leakage-space 72 into the leakage-space 75, and vice versa, and to be supplied, via the leakage-bore 77, to the return-flow bore 43, and also to the control-bores 49, 50 and 51, in accordance with the position of the slider.

While we have shown and described several embodiments in accordance with the present invention, it is understood that the same is not limited thereto but is susceptible to numerous changes and modifications as would be known to those skilled in the art of the present disclosure and we therefore do not wish to be limited to the details shown and described therein but intend to cover all such changes and modifications as are encompassed by the scope of the appended claims.

We claim:

1. A method for adapting a control system comprising the steps of generating control system input errors, establishing a threshold value for the amount of difference between the signs of the input errors, above which threshold control system corrective action is indicated, determining whether errors of one sign predominate over errors of the other sign, comparing the amount of errors of one sign over the amount of errors of the other sign to the threshold value, and generating an adaptation signal to the control system to take corrective action when the amount of difference between error signs exceeds the threshold.

2. The method of claim 1 wherein the step of generating control system input errors comprises the steps of generating a desired value for the system being controlled, generating an actual value related to the current condition of the system being controlled, comparing the desired and actual values, and generating the control system input error.

3. The method of claim 2 wherein the step of determining whether errors of one sign predominate over errors of the other sign comprises the step of assigning opposite signs to errors on opposite sides of the desired value.

4. The method of claim 3 wherein the step of determining whether errors of one sign predominate over errors of the other sign further comprises the step of integrating the signs of the errors.

5. The method of claim 4 wherein the step of establishing a threshold error sign differential above which control system corrective action is indicated comprises the step of operating upon the integral of the error's signs with a hysteresis function.

6. The method of claim 5 wherein the operation with a hysteresis function includes the step of maintaining the hysteresis function at its non-zero level until the integral of the signs of the errors goes to zero.

7. The method of claim 6 and further comprising the step of subtracting one of the non-zero level of the hysteresis function and the assigned signs of the errors from the other of the non-zero level of the hysteresis function and the assigned signs of the errors to drive the integral of the signs of the errors to zero more rapidly.

8. The method of claim 7 wherein the step of generating a signal to the control system to take corrective action comprises the steps of integrating the non-zero level of the hysteresis function to generate the adaptation signal.

9. The method of claim 8 and further comprising the step of generating an adapted control system output signal by subtracting one of the adaptation signal and the control system response to the input error from the other of the adaptation signal and the control system response to the input error.

10. The method of claim 9 and further comprising the step of providing the adapted control system output signal to the apparatus controlled by the control system.

11. An arrangement for self-adjusting the position of an actuator with the following features:
an actuator including an electrohydrolic servo valve which drives a working cylinder connected thereto;
a measured value transmitter connected to an adjustable piston of the working cylinder, said transmitter generating an actual value determined as a function of the movement of said adjustable piston;
means for determining controlled deviation from a required value and said actual value as directed to a control loop;
the control loop consisting of a controller means and an adaptation means, said controller means generating a correcting value at its output and said adaptation means generating an auxiliary correcting value at its output,
the control loop is arranged in such a manner that the controller means and adaptation means' outputs are combined to produce a correcting value which controls the servo valve, wherein the arrangement for self-adjusting the position of an actuator is characterized by the following features:

a means for supplying said controlled deviation to the inputs of both said controller means and said adaptation means, said adaptation means including a non-linear element in series with first integrator means and hysteresis means, the output of said hysteresis means providing the input to a second integrator means in addition to providing a negative feedback signal from its output to the input of the first integrator means, said second integrator means thereby providing the output of said adaptation system, said adaptation means thereby transforming said controlled deviation into said auxiliary correcting value;

output means connected to said controller means and said adaptation means for combining their outputs to form said single correcting value.

12. An arrangement for self-adjusting the position of an actuator, according to claim 11, wherein said controller means and adaptation means produce a correcting value which readjusts the actual characteristic curve of said servo value in relation to its theoretical characteristic curve, said actual curve deviating from said theoretical curve as a result of manufacturing tolerances and lack of compensation with respect to the varying operating conditions.

13. An arrangement for self-adjusting the position of an actuator, according to claim 12, wherein said varying operating conditions may arise from voltage being supplied to an electromagnetic coil of said servo valve and the resistance of said coil, or from pre-stress applied to a valve spring located in said servo valve and changes in its stiffness.

14. An arrangement for self-adjusting the position of an actuator, according to claim 13, including means connected to said output means for activating said electromagnetic coil of said servo valve by pulse width modulated signals, said signals being of a nature such that the maximum voltage-amplitude is switched on for periods ranging from zero to seven milliseconds, and the time for pulse-repetition range from five to seven milliseconds.

15. An arrangement for self-adjusting the position of an actuator, according to claim 11, wherein said servo valve controls an injection pump of diesel engine, said valve including a slider which is guided in a housing in a manner permitting movement in the axial direction, said housing possessing radial flow-ports and, in the region of the inner peripheral surface, at least one annular space carrying a fluid, said annular space being formed by plurality of radial flow-ports which intersect in the region of the inner peripheral surface of the housing thereby piercing the housing.

16. An arrangement for self-adjusting the position of an actuator, according to claim 11, wherein said servo valve includes an electrohydraulic servo valve for controlling the injection pump of a diesel engine, said valve possessing a slider which is guided in a housing in a manner permitting movement in an axial direction, and further including a compression spring for holding said valve in a normal position, said valve being shifted from this normal position under the action of an electromagnetic shifting device, wherein said device includes an armature fastened coaxially on said slider in a manner permitting adjustment.

17. An arrangement for self-adjusting the position of an actuator, according to claim 16, wherein said electrical shifting device includes a pole-ring whereby the overlap between said armature and said pole-ring can be influenced by means of a spacer-ring.

18. An arrangement for self-adjusting the position of an actuator, according to claim 11, wherein said servo valve includes electrohydraulics for controlling the injection pump of a diesel engine, said valve possessing a slider which is guided in a housing in a manner permitting movement in an axial direction, and further including a compression spring for holding a valve in a normal position and an electromagnetic shifting device for shifting the valve from this normal position, said housing possessing at least one radial flow-port, whereby said slider possesses an axial through-bore which connects leakage-spaces, said slider being connected by at least one radial leakage-bore to the flow-port.

19. An arrangement for self-adjusting the position of an actuator, according to claim 18, wherein said compression spring is supported in a conical recess in a self tapping socket-head screw, said screw being engaged into a magnetic core which carries said electromagnetic coil.

20. A method of controlling the position of an actuator having the steps of generating a signal indicative of an actuator position, generating a signal indicative of a desired actuator position, comparing the actuator position signal to the desired actuator position signal, generating an error signal from the comparison, providing the error signal to a controller, generating an adaptation signal in an adaptation system, generating a control signal in the controller, combining the control signal with the adaptation signal to provide an adapted control signal, and providing the adapted control signal to said actuator to control it, wherein the step of generating an adaptation signal comprises the steps of providing the error signal to the adaptation system, generating a signum function in response to the error signal, providing the signum function to an arithmatic point, integrating the signal at the arithmetic point, operating on the integral with a hysteresis function, providing the result of the hysteresis operation to the arithmatic point, and integrating the result of the hysteresis operation to provide the adaptation signal.

* * * * *